(12) United States Patent
Krammer et al.

(10) Patent No.: US 12,529,256 B2
(45) Date of Patent: Jan. 20, 2026

(54) DAMPER FOR A FITTING FOR MOVABLY MOUNTING A PIVOTING ELEMENT OR A PULL-OUT ELEMENT

(71) Applicant: Julius Blum GmbH, Hoechst (AT)

(72) Inventors: Bernhard Krammer, Hoechst (AT); Heike Seltmann, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/734,689

(22) Filed: Jun. 5, 2024

(65) Prior Publication Data

US 2024/0318490 A1 Sep. 26, 2024

Related U.S. Application Data

(63) Continuation of application No. PCT/EP2022/084580, filed on Dec. 6, 2022.

(30) Foreign Application Priority Data

Dec. 14, 2021 (EP) ..................................... 21214294

(51) Int. Cl.
*E05F 5/10* (2006.01)
(52) U.S. Cl.
CPC ...................................... *E05F 5/10* (2013.01)
(58) Field of Classification Search
CPC ........... E05Y 2900/20; E05Y 2900/202; E05Y 2900/204; E05Y 2900/208; E05Y 2201/20;
(Continued)

(56) References Cited

U.S. PATENT DOCUMENTS

| 2,912,069 A | 11/1959 | Dillenburger |
| 8,220,602 B2 | 7/2012 | Grabher |

(Continued)

FOREIGN PATENT DOCUMENTS

| AT | 010 342 | 1/2009 |
| AT | 12 633 | 9/2012 |

(Continued)

OTHER PUBLICATIONS

International Search Report issued Mar. 20, 2023 in International (PCT) Application No. PCT/EP2022/084580.

*Primary Examiner* — Chuck Y Mah
(74) *Attorney, Agent, or Firm* — Wenderoth, Lind & Ponack, L.L.P.

(57) ABSTRACT

A damper is provided for a fitting for movably supporting a pivoting element or a pull-out element relative to a stationary carrier. The damper includes a damper housing, a fluid chamber arranged in the damper housing, a damping fluid arranged in the fluid chamber, a piston displaceably supported in the fluid chamber, and a sealing element having a first section which bears against or which is configured to bear against an inner wall of the fluid chamber. The sealing element includes a second section, the second section being spaced apart from the inner wall of the fluid chamber and being configured to be moved, preferably pivoted, tilted and/or radially widened, above a predetermined threshold value of a pressure application to the piston, relative to the first section which bears against or which is configured to bear against the inner wall of the fluid chamber.

23 Claims, 6 Drawing Sheets

(58) Field of Classification Search
CPC ........ E05Y 2201/21; E05F 5/00; E05F 5/003;
E05F 5/06; E05F 5/08; E05F 5/10; E05F
5/006; E05F 5/02; E05D 11/1021; E05D
11/1042; E05D 11/105; E05D 11/1064;
E05D 7/04; E05D 7/0407; E05D 7/125;
E05D 3/142
See application file for complete search history.

(56) References Cited

U.S. PATENT DOCUMENTS

| | | | |
|---|---|---|---|
| 10,527,122 B2 * | 1/2020 | Kus | F16F 9/49 |
| 10,865,597 B2 | 12/2020 | Chen et al. | |
| 11,140,984 B2 | 10/2021 | Goetz | |
| 2004/0231099 A1 * | 11/2004 | Li | E05F 5/08 |
| | | | 16/85 |
| 2006/0118371 A1 * | 6/2006 | Zimmer | F16F 9/368 |
| | | | 188/280 |
| 2007/0175717 A1 | 8/2007 | Grabher | |
| 2012/0085607 A1 * | 4/2012 | Weber | E05F 5/10 |
| | | | 188/282.1 |
| 2014/0352111 A1 * | 12/2014 | Ng | E05F 5/006 |
| | | | 16/286 |
| 2015/0226284 A1 * | 8/2015 | Dora | E05F 5/02 |
| | | | 188/280 |
| 2017/0016260 A1 * | 1/2017 | Pyo | F16F 9/19 |
| 2018/0266512 A1 * | 9/2018 | Zimmer | E05F 5/02 |
| 2019/0136934 A1 | 5/2019 | Chen et al. | |
| 2020/0128960 A1 | 4/2020 | Goetz | |
| 2020/0347837 A1 * | 11/2020 | Zimmer | F16F 9/346 |
| 2021/0148148 A1 * | 5/2021 | Weber | E05F 3/12 |
| 2025/0179854 A1 * | 6/2025 | Prentner | F16F 9/3415 |

FOREIGN PATENT DOCUMENTS

| | | | | |
|---|---|---|---|---|
| CN | 201027890 Y | * | 2/2008 | ............... E05F 5/02 |
| CN | 105889394 | | 8/2016 | |
| CN | 212249643 | | 12/2020 | |
| DE | 202 19 411 | | 10/2003 | |
| EP | 1 563 763 | | 8/2005 | |
| GB | 2576177 A | * | 2/2020 | ............. F16F 9/516 |
| JP | 56-32152 | | 3/1981 | |
| JP | 2019-84342 | | 6/2019 | |
| JP | 2020-526689 | | 8/2020 | |
| KR | 20-0382473 | | 4/2005 | |
| WO | 03/100287 | | 12/2003 | |
| WO | 2007/143760 | | 12/2007 | |

* cited by examiner

DAMPER FOR A FITTING FOR MOVABLY MOUNTING A PIVOTING ELEMENT OR A PULL-OUT ELEMENT

The present invention is a continuation of International Application PCT/EP2022/084580 filed on Dec. 6, 2022. Thus, all of the subject matter of International Application PCT/EP2022/084580 is incorporated herein by reference.

BACKGROUND OF THE INVENTION

The present invention relates to a damper for a fitting for movably supporting a pivoting element or a pull-out element, in particular for movably supporting a furniture part, a window or a door, relative to a stationary carrier. The damper includes:
- a damper housing,
- at least one fluid chamber arranged in the damper housing,
- a damping fluid arranged in the fluid chamber,
- at least one piston displaceably supported in the fluid chamber, and
- at least one, preferably ring-shaped, sealing element having at least a first section which bears against or which is configured to bear against an inner wall of the fluid chamber.

Moreover, the invention concerns a fitting comprising at least one damper of the type to be described, the fitting being configured, in particular, as a hinge, as a furniture drive or as a drawer pull-out guide for moving a movable furniture part.

Such dampers are utilized, for example, for dampening a movement of pivoting elements or of pull-out elements (for example drawers, doors, flaps or windows), or of movably-supported components of furniture fittings so as to prevent a noisy slamming and damages of the pivoting elements or of the pull-out elements.

The damping action of a damper is generated by the flow resistance of a damping fluid arranged in a damper housing. Upon a pressure application, the piston is displaced within the fluid chamber, and the damping fluid streams from the high-pressure side to the low-pressure side through piston openings and/or through a gap formed between the piston and an inner wall of the fluid chamber and/or through at least one groove arranged on an inner wall of the fluid chamber.

Upon an excessive pressure application to the piston, for example in the event of improper use, a so-called damper bouncing may occur. In such an overload case, the damping fluid can no longer stream through the piston or past the piston to a sufficient extent. The increased pressure can then no longer be dissipated by the damper, so that the piston and the piston rod fixed thereon come to an abrupt halt or bounce back. In an extreme case, the damper housing can burst due to the increased pressure, and the hydraulic damping fluid can leak out from the damper housing.

The AT 10 342 U1 reference discloses a furniture damper having a cylinder and a piston displaceable within the cylinder. The piston includes at least one overload opening for the passage of a damping fluid. Moreover, a closure element displaceable relative to the piston is provided, the closure element being configured to close the overload opening of the piston at the beginning of the damping stroke. During normal operation, the damping fluid can stream exclusively through an annular gap formed between the piston and an inner wall of the cylinder. Upon an increased pressure application, the closure element is radially widened, so that the size of the annular gap is decreased and thus the flow resistance can be increased. In the overload case, the closure element can be widened to such an extent in a radial direction until the overload opening of the piston can be unblocked and a rapid pressure dissipation within the cylinder can be brought about.

A drawback with the AT 10 342 U1 reference is the fact that the annular closure element has a material cross-section which defines both the expansion properties as well as the stiffness of the closure element. If the material of the closure element is too soft, the closure element can admittedly bear against the inner wall of the cylinder to a sufficient extent. However, in this case, the overload opening of the piston is opened too fast. In contrast, if the material of the closure element is too hard, then the closure element only bears against the inner wall of the cylinder in an insufficient manner, and the overload opening of the piston is opened too late. A further drawback is the fact that the occurring manufacturing tolerances on the inner wall of the cylinder and in the region of the overload opening can only be insufficiently compensated by the annular closure element. Overall, the application range of the damper is limited.

SUMMARY OF THE INVENTION

Therefore, it is an object of the present invention to propose a damper mentioned in the introductory part, thereby avoiding the above-discussed drawbacks.

According to the invention, the at least one sealing element includes at least one, preferably substantially ring-shaped, second section. The second section is spaced apart from the inner wall of the fluid chamber and is configured to be moved, preferably pivoted, tilted and/or radially widened, above a predetermined threshold value of a pressure application to the piston, relative to the first section which bears against or which is configured to bear against the inner wall of the fluid chamber.

In other words, the at least one sealing element includes a first section bearing against the inner wall of the fluid chamber so as to seal the fluid chamber, or which is configured to bear against an inner wall of the cylinder when a damping stroke is performed.

The sealing element further includes a second section configured to be moved relative to the first section, preferably pivoted, tilted and/or radially widened, above a predetermined threshold value of a pressure application to the piston.

According to an embodiment, the second section of the at least one sealing element, above the predetermined threshold value of a pressure application to the piston, is configured to pivot, tilted and/or radially widened, in a direction of the inner wall of the fluid chamber, so as to open at least one overload channel. Preferably, the at least one overload channel is arranged in the piston.

The at least one overload channel, which is preferably arranged in the at least one piston, can be covered by the second section of the at least one sealing element, when the damping stroke is performed below the predetermined threshold value of the pressure application to the piston. Above the predetermined threshold value of the pressure application to the piston, the at least one overload channel can be unblocked by the second section of the at least one sealing element.

BRIEF DESCRIPTION OF THE DRAWINGS

Further details and advantages of the present invention result from the following description of figures, in which.

DETAILED DESCRIPTION OF THE INVENTION

Figure 1:
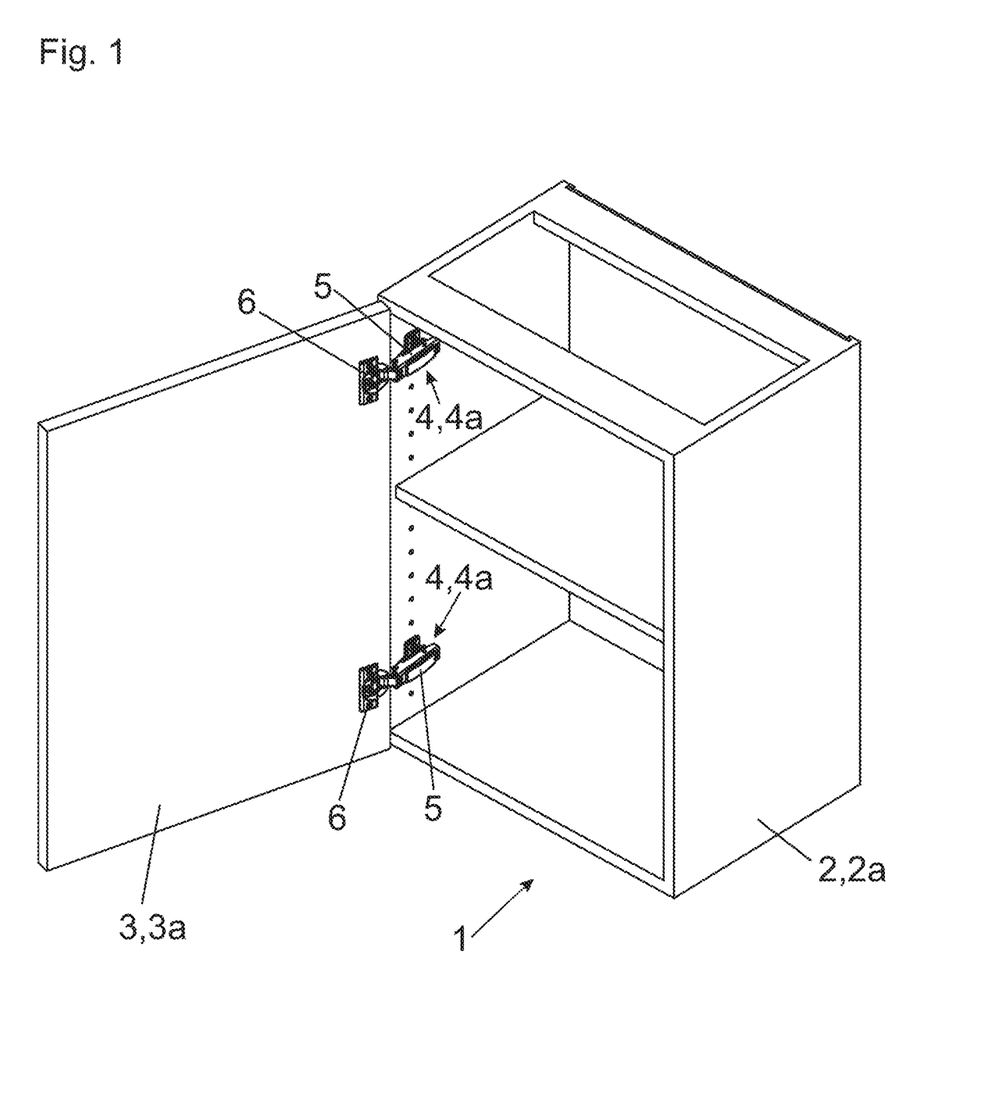
FIG. 1 is a perspective view of an item of furniture comprising a pivoting element and fittings for movably supporting the pivoting element.

FIG. 1 shows a perspective view of an item of furniture 1 comprising a stationary carrier 2 (for example in the form of a furniture carcass 2a), a movable pivoting element 3 or a pull-out element (for example in the form of a movable furniture part 3a), and at least one fitting 4 (for example in the form of hinges 4a) for movably supporting the pivoting element 3 or the pull-out element relative to the stationary carrier 2.

In the shown embodiment, the fittings 4 include a first fitting portion 5 configured to be fixed to the stationary carrier 2, and a second fitting portion 6 configured to be fixed to the pivoting element 3 or to the pull-out element. The first fitting portion 5 and the second fitting portion 6 are hingedly connected to each other.

The fitting 4 includes at least one damper 9 (not shown here), the damper 9 being configured to dampen a relative movement of the two fitting portions 5, 6 to each other. By virtue of the damper 9, a closing movement and/or an opening movement of the pivoting element 3 or of the pull-out element can be dampened until reaching the fully closed end position and/or until reaching the fully opened end position.

Figure 2A:
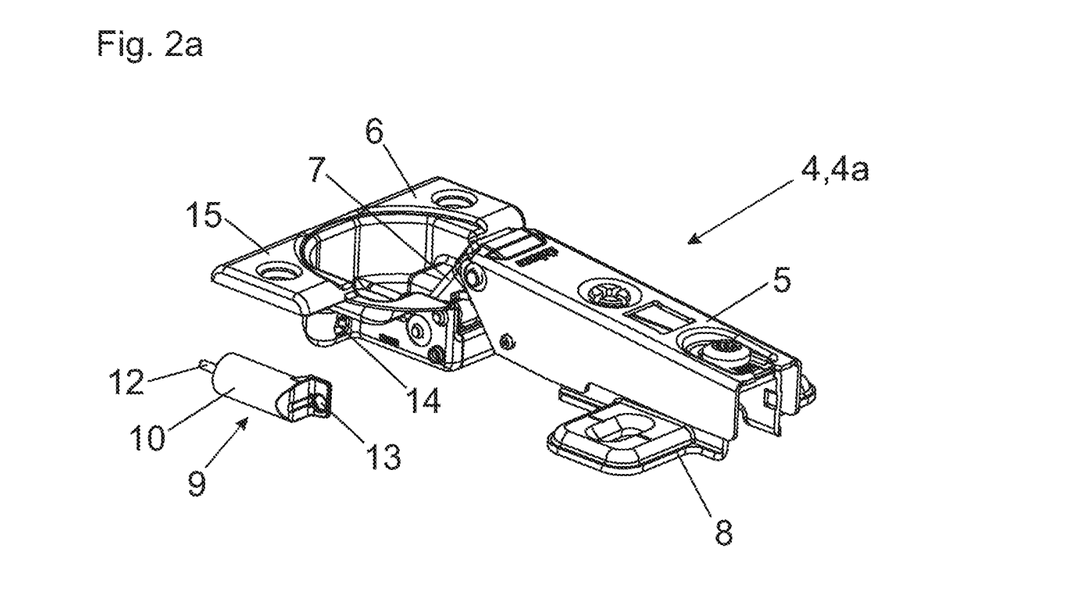
FIG. 2a, 2b are perspective views of a fitting with a damper in a separated condition and in a connected condition relative to each other.

FIG. 2a shows the fitting 4 in the form of a hinge 4a for movably supporting the pivoting element 3 relative to the stationary carrier 2. The fitting 4 includes a first fitting portion 5 configured to be fixed to the stationary carrier 2, and a second fitting portion 6 configured to be fixed to the pivoting element 3. The two fitting portions 5, 6 are pivotally connected to each other via at least one hinge lever 7, preferably via at least two hinge levers 7.

According to an embodiment, the first fitting portion 5 can include a hinge arm and/or the second fitting portion 6 can include a hinge cup.

The fitting 4 includes at least one damper 9 configured to dampen a relative movement of the two fitting portions 5, 6 to each other. The at least one damper 9 includes a, for example cylindrical, damper housing 10, and a piston rod 12 is displaceably supported relative to the damper housing 10.

The second fitting portion 6 includes a hole 14, and the piston rod 12 of the damper 9 is guided through the hole 14 in a mounted condition.

In the shown embodiment, the damper 9 can be arranged on an outer side of the second fitting portion 6 via at least one fastening location 13. In a mounted condition, the damper 9 is arranged underneath a fastening flange 15 of the second fitting portion 6. The second fitting portion 6, col-lectively with the damper 9, is configured to be partially arranged within a single cylindrical bore of the pivoting element 3.

Figure 2B:
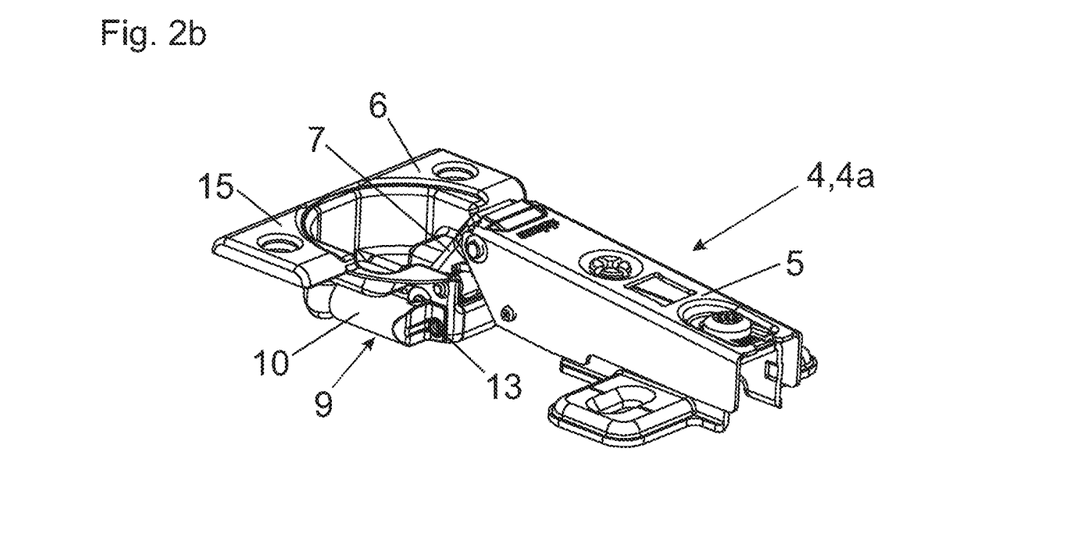

FIG. 2b shows the fitting 4 in the form of the hinge 4a according to FIG. 2a with the damper 9 in a mounted condition.

Figure 3A:
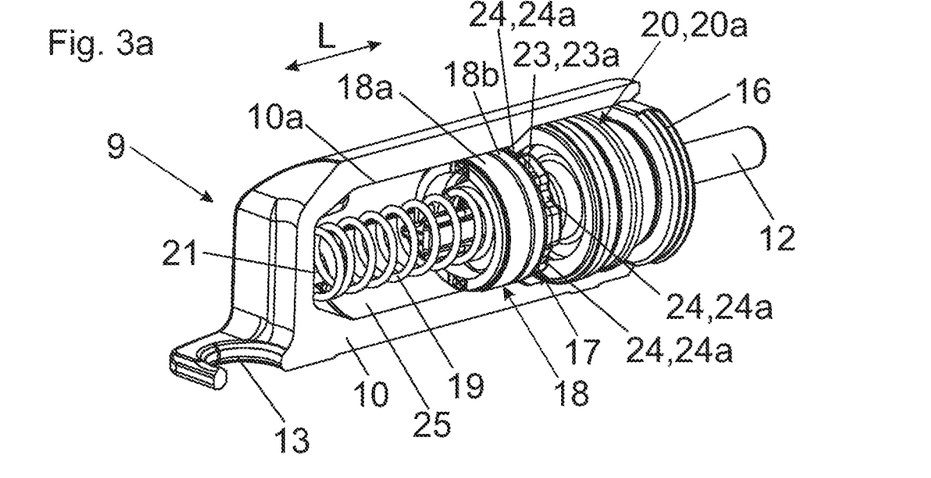
FIG. 3a-3c show the damper in different views and in two different operating positions of the sealing element.

FIG. 3a shows the damper 9 in a cross-sectional view. The damper 9 includes a damper housing 10, at least one fluid chamber 25 arranged in the damper housing 10, a damping fluid arranged in the fluid chamber 25, at least one piston 17 displaceably supported in the fluid chamber 25, and at least one, preferably ring-shaped, sealing element 18. The sealing element 18, at least with a first section 18a, bears against or is configured to bear against an inner wall 10a of the fluid chamber 25.

The damping fluid can include a hydraulic damping fluid (for example silicone oil) and, if appropriate, solid body particles.

Moreover, the sealing element 18 includes at least one, preferably substantially ring-shaped, second section 18b which is spaced apart from the inner wall 10a of the fluid chamber 25, preferably under the formation of a gap 22 (see FIG. 3b), during normal operation of the damper 9 (that is to say below a predetermined threshold value of a pressure application to the piston 17).

The piston 17 includes at least one overload channel 23 which is closed by the second section 18b of the sealing element 18 during a normal operation of the damper 9 (that is to say below a predetermined threshold value of a pressure application to the piston 17). The overload channel 23 can include at least one passage 23a, preferably a plurality of passages 23a, arranged in the piston 17.

The damper 9 includes at least one return channel 24 configured to be opened upon a movement of the piston 17 in a direction opposite the damping stroke. For example, the at least one sealing element 18 is movable relative to the at least one piston 17, and the at least one sealing element 18 blocks the return channel 24 in a first relative position to the piston 17, and unblocks the return channel 24 in a second relative position to the piston 17, and/or the return channel 24 includes at least one recess 24a, preferably a plurality of recesses 24a, arranged in the piston 17, and it is particularly preferable that the at least one recess 24a is arranged on a peripheral edge of the piston 17, and/or the return channel 24 includes an axial gap 34 (see FIG. 5b) arranged between the at least one piston 17 and the at least one sealing element 18. Preferably, a size of the axial gap 34 is variable upon a movement of the piston 17 in a direction opposite the damping stroke.

The damper 9 further includes a return spring 19 (for example a helical spring in the form of a compression spring) configured to return the piston 17 at least partially in a direction of an initial position after a performed damping stroke. The return spring 19 can be supported on an end face 21 of the fluid chamber 25 and presses the piston 17 in a direction opposite the damping stroke.

The damper 9 further includes at least one volume compensating device 20 configured to compensate for a displaceable volume of the damping fluid when the piston rod 12 is immersed into the fluid chamber 25.

By a closure element 16, the fluid chamber 25 can be closed.

Figure 3B:
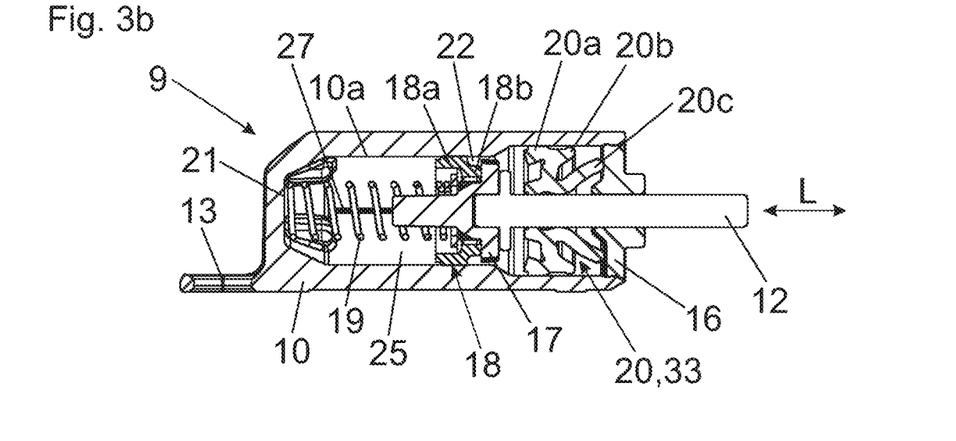

FIG. 3b shows the damper 9 according to FIG. 3a in a cross-sectional view, in which the sealing element 18 is located in a resting position. The sealing element 18 includes a first section 18*a* which bears against or which is configured to bear against the inner wall 10*a* of the fluid chamber 25. A second section 18*b* of the sealing element 18 is spaced apart from the inner wall 10*a* of the fluid chamber 25 under the formation of a gap 22.

The first section 18*a* and the at least one second section 18*b* of the sealing element 18 are spaced apart from each other in a longitudinal direction (L) of the damper housing 10.

The first section 18*a* and the at least one second section 18*b* of the sealing element 18, in a longitudinal cross-section and at least in a resting condition of the damper 9, form a substantially Z-shape.

For example, the sealing element 18 can be made of a thermoplastic elastomer (TPE).

In the shown embodiment, the first section 18*a* and the second section 18*b* of the sealing element 18 are formed together so as to have an integral one-piece configuration and are movably connected to each other, for example a via film hinge.

Basically, it would also be conceivable that the two sections 18*a*, 18*b* of the sealing element 18 are configured as components separate from each other, in particular also made of different materials.

The damper 9 includes at least one streaming channel 27 which is preferably arranged on the inner wall 10*a* of the fluid chamber 25, and the damping fluid streams through the streaming channel 27 when a damping stroke is performed.

According to preferred embodiments, the at least one volume compensating device 20
  includes at least one seal 20*a* configured to seal the fluid chamber 25 relative to the piston rod 12 and/or relative to an inner wall 10*a* of the damper housing 10, and/or
  includes at least one support element 20*b* configured to guide the at least one seal 20*a* in the damper housing 10, and/or
  includes at least one spring element 20*c* configured to return the at least one seal 20*a* at least partially in a direction of an initial position after a damping stroke has been performed.

According to a preferred embodiment, the at least one spring element 20*c* and the at least one seal 20*a* are formed together and/or the at least one spring element 20*c* and the at least one support element 20*b* are formed together to a common compensating member 33 so as to have an integral one-piece configuration.

Figure 3C:
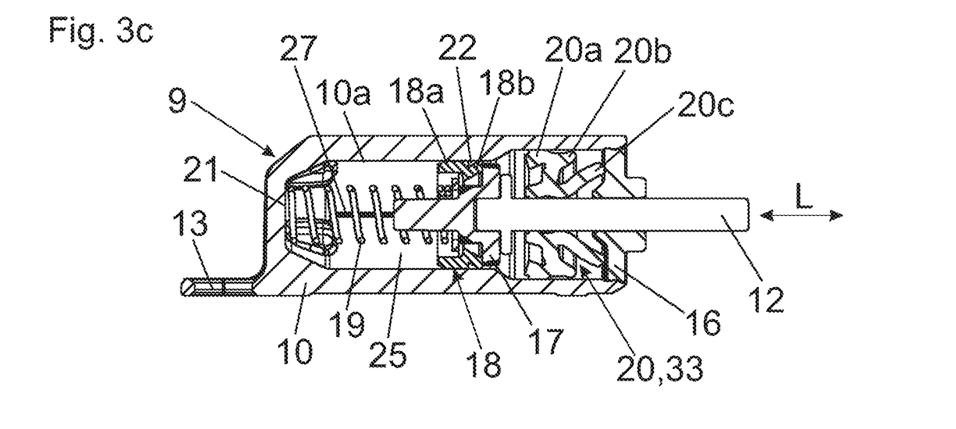

FIG. 3*c* shows the damper 9 in an overload case, in which a damping stroke is performed with a pressure application to the piston above a predetermined threshold value. In such an overload case, the second section 18*b* is bendable, tiltable and/or can be radially widened relative to the first section 18*a* of the sealing element 18 in a direction towards the inner wall 10*a* of the fluid chamber 25. In this way, the size of the gap 22 formed between the sealing element 18 and the inner wall 10*a* can be reduced, and the overload channel 23 of the piston 17 can be at least partially opened (see also FIG. 5*c*). Therefore, a larger amount of the damping fluid can stream from the high-pressure side to the low-pressure side of the damper 9 so as to dissipate the increased pressure of the damping fluid in the overload case. In other words, in addition to the damping fluid passing though the streaming channel 27 as during normal operation, an additional amount of the damping fluid can now also pass through the overload channel 23.

Figure 4A:
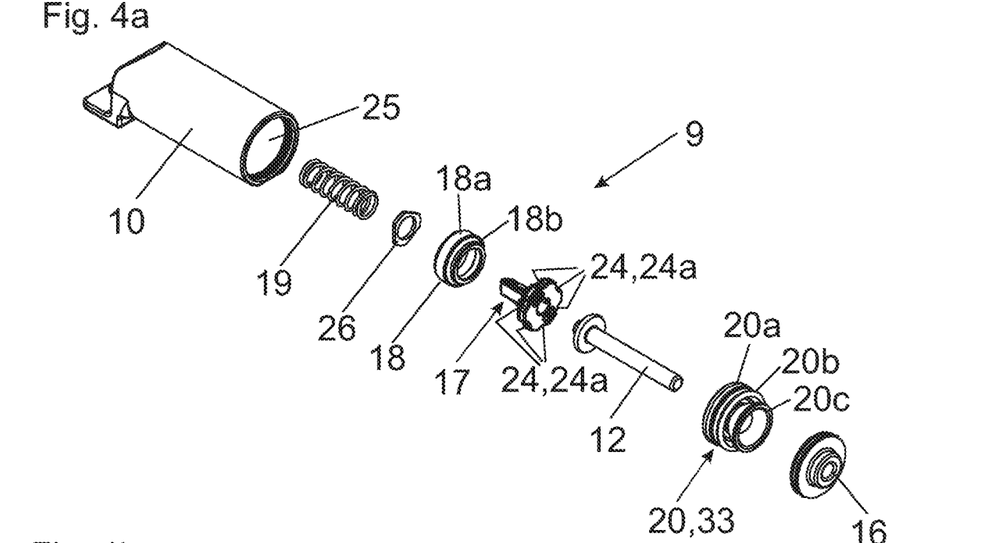
FIG. 4a-4d show the damper in an exploded view and the piston assembly in different views.

FIG. 4*a* shows the damper 9 in an exploded view. The damper housing 10 includes at least one fluid chamber 25 for displaceably supporting the piston 17. The piston 17, after the damping stroke has been performed, can be at least partially returned into an initial position by a force of the return spring 19.

A limiting element 26 is to be fixed to the piston 17. The sealing element 18, in a mounted condition, is displaceably supported in a limited manner between the limiting element 26 and the piston 17. In this way, the sealing element 18, upon a return movement by the return spring 19, can be spaced with a larger distance from the recesses 24*a* of the piston 17. As a result, a larger amount of damping fluid can stream from the high-pressure side to the low-pressure side when the piston rod 12 is returned, and a rapid return movement of the piston rod 12 into an initial position can be provided.

The sealing element 18 can be configured rotationally symmetrical, and the first section 18*a* has a larger diameter than the second section 18*b*.

Figure 4B:
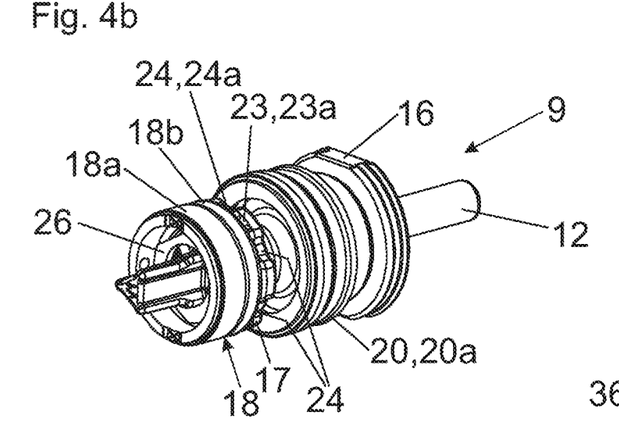

FIG. 4*b* shows the damper 9 in which the damper housing 10 is not depicted for the sake of improved overview. The sealing element 18 with the first section 18*a* and the second section 18*b* is limitedly displaceable between the piston 17 and the limiting element 26 in an axial direction.

The piston 17 includes at least one return channel 24 with at least one recess 24*a*, preferably with a plurality of recesses 24*a*. According to an embodiment, the at least one recess 24*a* is arranged on a peripheral edge of the piston 17.

Figure 4C:
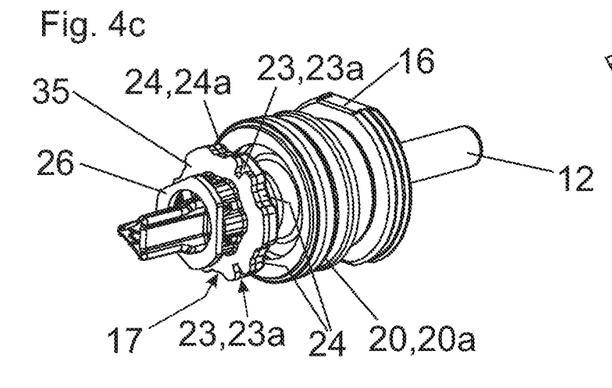

FIG. 4*c* shows the damper 9 according to FIG. 4*b*, in which the sealing element 18 is not depicted for the sake of improved overview. In this figure, the overload channels 23 of the piston 17 are well to be seen. The overload channels 23 include at least one passage 23*a*, preferably a plurality of passages 23*a*, arranged in the piston 17. For example, the at least one passage 23*a* is arranged on a peripheral edge of the piston 17.

Figure 4D:
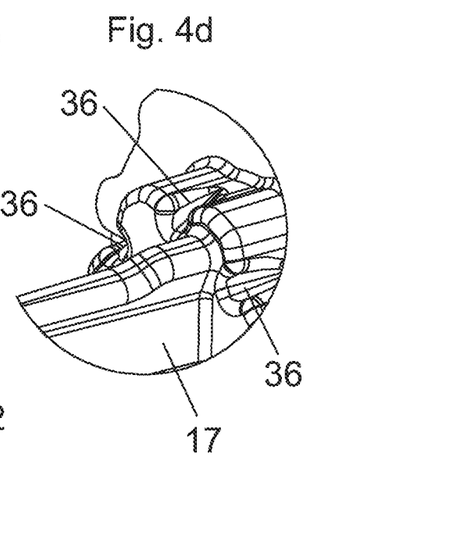

FIG. 4*d* shows a partial region of the piston 17 in a perspective view. The piston 17 includes at least one axial channel 36, preferably a plurality of axial channels 36, for the passage of the damping fluid. The axial channels 36 are part of the return channel 24 by which a larger amount of damping fluid can stream from the first side of the piston 17 to a second side when the return stroke is performed.

The at least one axial channel 36 can extend parallel, conically or radially relative to the longitudinal direction (L) of the damper housing 10. For example, the piston 17 includes a plurality of axial channels 36 which are arranged on a peripheral edge of the piston 17, preferably in a symmetrical manner.

In the shown embodiment, the piston 17 includes a plurality of passages 23*a* which can be arranged on a peripheral edge of the piston 17 in a symmetrical manner. The passages 23*a* can be covered by the second section 18*b* of the sealing element 18 when the damping stroke is performed below a predetermined threshold value of a pressure application to the piston 17, and can be unblocked by the second section 18*b* of the sealing element 18 above the predetermined threshold value of a pressure application to the piston 17.

Preferably, precisely three passages 23*a* are provided, the three passages 23*a* being arranged offset about 120° on the peripheral edge of the piston 17.

In the shown embodiment, the piston 17 includes at least one disc element 35 on which the at least one sealing element 18 can be supported at least when the damping stroke is performed.

Figure 5A:
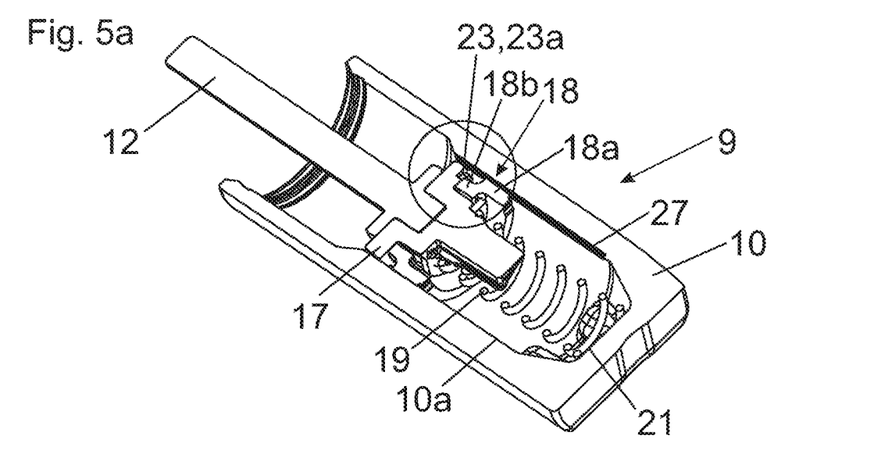
FIG. 5a-5c show the damper in a cross-sectional view and enlarged detail views with the sealing element in a normal condition and in an overload condition.

FIG. 5*a* shows the damper 9 in a cross-sectional view, in which the sealing element 18 with the two sections 18*a*, 18*b* can be seen. The first section 18*a* of the sealing element 18 bears against the inner wall 10a of the fluid chamber 25, or is configured to bear against the inner wall 10a of the fluid chamber 25 when the damping stroke is performed. The second section 18b of the sealing element 18, during normal operation, is spaced apart from the inner wall 10a via a gap 22 formed between the inner wall 10a and the second section 18b.

The damper 9 includes at least one streaming channel 27 which is preferably arranged on the inner wall 10a of the fluid chamber 25, and the damping fluid streams through the streaming channel 27 when the damping stroke is performed. However, also two or more streaming channels 27 arranged on the inner wall 10a can be provided.

The at least one streaming channel 27 can be in the form of a longitudinal groove. According to an embodiment, a cross-section of the at least one streaming channel 27 is configured to be varied, preferably in a continually decreasing manner, in a direction of the damping stroke.

Figure 5B:
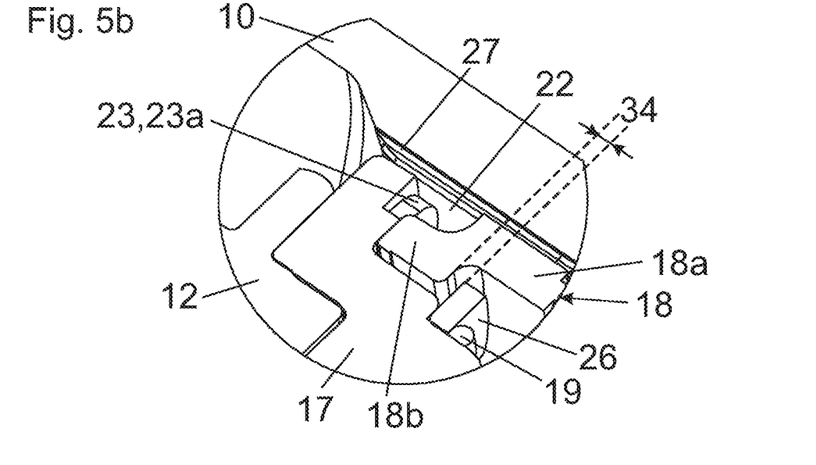

FIG. 5b shows the encircled region of FIG. 5a in an enlarged view. When the piston 17 is moved below a predetermined threshold value, the overload channel 23 with the passage 23a is blocked by the second section 18b of the sealing element 18. During such a normal operation, the damping fluid streams, preferably exclusively, through the at least one streaming channel 27.

An axial gap 34 arranged between the piston 17 and the limiting element 26a can be seen by which the sealing element 18 is movably supported relative to the piston 17. Upon a movement of the piston 17 in a direction opposite the damping stroke, the sealing element 18 can bear against the limiting element 26. As a result, a size of the gap 34 can be varied, and a larger amount of damping fluid can stream from one side of the piston to the other side when the piston rod 12 is returned.

Figure 5C:
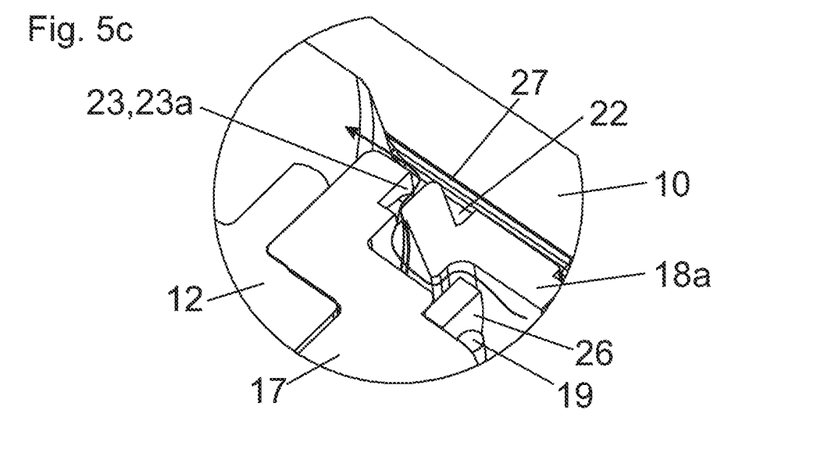

FIG. 5c shows the overload situation, in which the piston 17 is thus moved with a pressure application above a predetermined threshold value. Due to a bending movement or a tilting movement of the second section 18b relative to the first section 18a, the size of the radial gap 22 formed between the piston 17 and the inner wall 10a can be reduced, and the overload channel 23 with the passage 23a can be unblocked by the second section 18b of the sealing element 18. Accordingly, in the overload case, the damping fluid can stream from the high-pressure side to the low-pressure side along the depicted arrow.

Figure 6A:
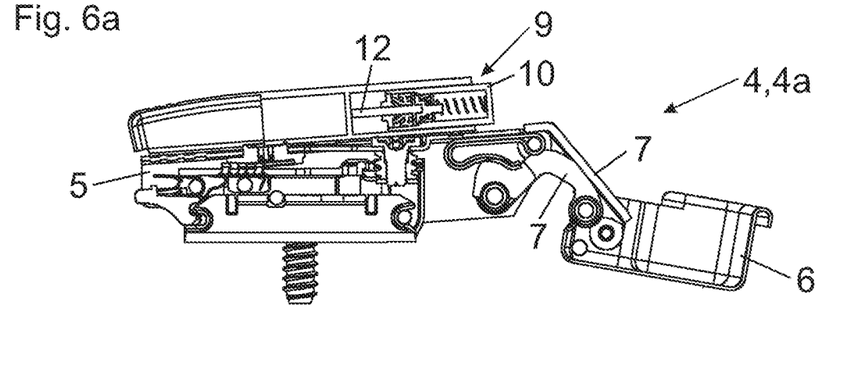
FIG. 6a-6c show different embodiments of fittings comprising a damper.
Figure 6B:
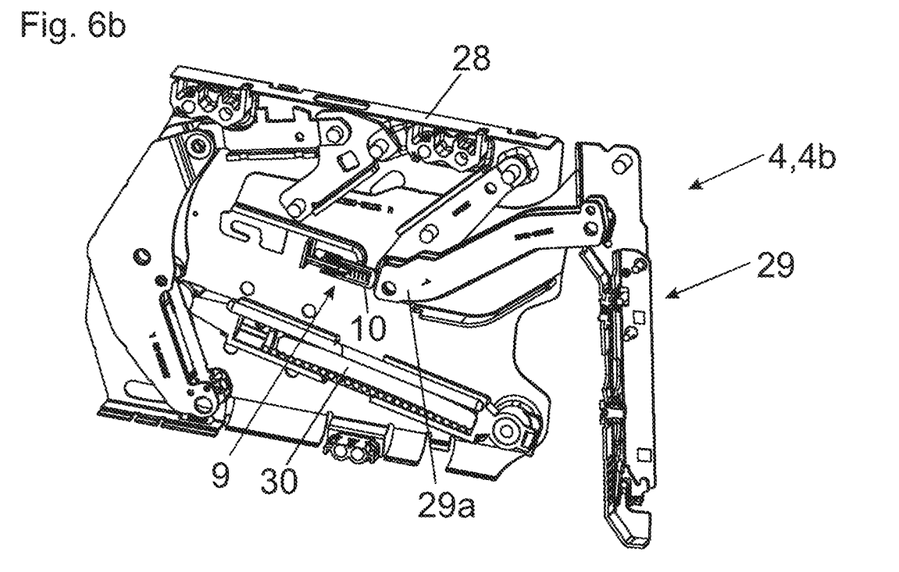
Figure 6C:
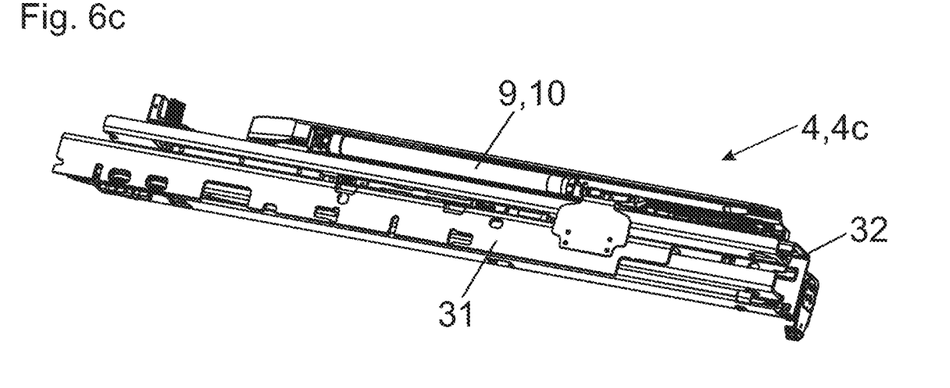

FIG. 6a-6c show different fittings 4 for movably supporting a movable furniture part 3a.

FIG. 6a shows a fitting 4 in the form of a hinge 4a, the hinge 4a comprising a first fitting portion 5 configured to be fixed to the stationary carrier 2 and a second fitting portion 6 configured to be fixed to the movable furniture part 3a. The first fitting portion 5 and the second fitting portion 6 are pivotally connected to each other by at least one hinge lever 7, preferably by at least two hinge levers 7. In the shown embodiment, the damper 9 with the damper housing 10 is set onto the first fitting portion 5. At the end of the closing movement of the hinge 4a, the damper housing 10 is pushed-in relative to the stationary piston rod 12 so as to dampen the closing movement of the hinge 4a.

FIG. 6b shows a fitting 4 in the form of a furniture drive 4b for moving a movable furniture part 3a. The furniture drive 4b includes a base body 28 configured to be fixed to the stationary carrier 2 (for example to the furniture carcass 2a), an actuating arm assembly 29 arranged on the base body 28 for moving the movable furniture part 3a, the actuating arm assembly 29 being configured to be connected to the movable furniture part 3a. The furniture drive 4b further includes a force storage member 30 for applying a force to the actuating arm assembly 29. At the end of the closing movement, the damper housing 10 of the damper 9 can be pushed-in relative to the stationary piston rod 12 by a pivotable actuating arm 29a of the actuating arm assembly 29, and a closing movement of the actuating arm assembly 29 can be dampened.

FIG. 6c shows a fitting 4 in the form of a drawer pull-out guide 4c for moving a drawer relative to a furniture carcass 2a. The drawer pull-out guide 4c includes at least two guide rails 31, 32 displaceable relative to each other, and a movement of a guide rail 31, 32 can be dampened at the end of the closing movement by the damper 9 having the damper housing 10.

The invention claimed is:

1. A damper for a fitting for movably supporting a pivoting element or a pull-out element relative to a stationary carrier, the damper comprising:
   a damper housing,
   a fluid chamber arranged in the damper housing,
   a damping fluid arranged in the fluid chamber,
   a piston displaceably supported in the fluid chamber,
   a streaming channel configured to allow the damping fluid to bypass the piston during a damping stroke,
   a piston rod attached to the piston and extending out of the damper housing,
   a sealing element having:
      a first section configured to bear against an inner wall of the fluid chamber, and
      a second section spaced apart from the inner wall of the fluid chamber and configured to be moved relative to the first section above a predetermined threshold value of a pressure application to the piston, and
   an overload channel configured such that, when a damping stroke is performed below the predetermined threshold value of the pressure application to the piston, the overload channel is covered by the second section of the sealing element, and such that the overload channel is at least partially open when a damping stroke is performed above the predetermined threshold value of the pressure application to the piston.

2. The damper according to claim 1, wherein the overload channel includes a passage arranged in the piston.

3. The damper according to claim 2, wherein the passage of the overload channel is one of a plurality of passages arranged in a peripheral edge of the piston.

4. The damper according to claim 1, wherein the first section and the second section of the sealing element are spaced apart from each other in a longitudinal direction of the damper housing, and/or the first section and the second section of the sealing element are formed together so as to have an integral one-piece configuration.

5. The damper according to claim 1, wherein the streaming channel is arranged on the inner wall of the fluid chamber, and is configured to allow the damping fluid to stream therethrough when a damping stroke is performed.

6. The damper according to claim 1, wherein the at least one-sealing element is axially displaceably supported on the piston.

7. A damper for a fitting for movably supporting a pivoting element or a pull-out element relative to a stationary carrier, the damper comprising:
   a damper housing,
   a fluid chamber arranged in the damper housing,
   a damping fluid arranged in the fluid chamber,
   a piston displaceably supported in the fluid chamber, a streaming channel configured to allow the damping fluid to bypass the piston during a damping stroke,
a piston rod attached to the piston and extending out of the damper housing,
a sealing element having:
  a first section configured to bear against an inner wall of the fluid chamber, and
  a second section spaced apart from the inner wall of the fluid chamber and configured to be moved relative to the first section above a predetermined threshold value of a pressure application to the piston, and
a return channel formed by at least one of the piston and the sealing element, and configured to be opened upon a movement of the piston in a direction opposite the damping stroke.

8. The damper according to claim 7, wherein:
the sealing element is movable relative to the piston, and is configured to close the return channel in a first position relative to the piston, and to open the return channel in a second position relative to the piston, and/or
the return channel includes a recess arranged in the piston, and/or
the return channel includes an axial gap arranged between the piston and the sealing element.

9. The damper according to claim 8, wherein the recess of the return channel is one of a plurality of recesses arranged in a peripheral edge of the piston, and a size of the axial gap of the return channel is variable based upon a movement of the piston in a direction opposite the damping stroke.

10. A damper for a fitting for movably supporting a pivoting element or a pull-out element relative to a stationary carrier, the damper comprising:
a damper housing,
a fluid chamber arranged in the damper housing,
a damping fluid arranged in the fluid chamber,
a piston displaceably supported in the fluid chamber,
a streaming channel configured to allow the damping fluid to bypass the piston during a damping stroke,
a piston rod attached to the piston and extending out of the damper housing, and
a sealing element having:
  a first section configured to bear against an inner wall of the fluid chamber, and
  a second section spaced apart from the inner wall of the fluid chamber and configured to be moved relative to the first section above a predetermined threshold value of a pressure application to the piston,
wherein the piston includes an axial channel for the passage of the damping fluid.

11. The damper according to claim 10, wherein the axial channel of the piston is one of a plurality of axial channels for the passage of the damping fluid.

12. The damper according to claim 1, wherein the piston includes disc element on which the sealing element is supported at least when a damping stroke is performed.

13. A damper for a fitting for movably supporting a pivoting element or a pull-out element relative to a stationary carrier, the damper comprising:
a damper housing,
a fluid chamber arranged in the damper housing,
a damping fluid arranged in the fluid chamber,
a piston displaceably supported in the fluid chamber,
a streaming channel configured to allow the damping fluid to bypass the piston during a damping stroke,
a piston rod attached to the piston and extending out of the damper housing, and a sealing element having:
  a first section configured to bear against an inner wall of the fluid chamber, and
  a second section spaced apart from the inner wall of the fluid chamber and configured to be moved relative to the first section above a predetermined threshold value of a pressure application to the piston,
wherein the first section and the second section of the sealing element form substantially a Z-shape in a longitudinal cross-section and in a resting condition of the damper.

14. A damper for a fitting for movably supporting a pivoting element or a pull-out element relative to a stationary carrier, the damper comprising:
a damper housing,
a fluid chamber arranged in the damper housing,
a damping fluid arranged in the fluid chamber,
a piston displaceably supported in the fluid chamber,
a streaming channel configured to allow the damping fluid to bypass the piston during a damping stroke,
a piston rod attached to the piston and extending out of the damper housing,
a sealing element having:
  a first section configured to bear against an inner wall of the fluid chamber, and
  a second section spaced apart from the inner wall of the fluid chamber and configured to be moved relative to the first section above a predetermined threshold value of a pressure application to the piston, and
a volume compensating device configured to compensate for a displaceable volume of the damping fluid when the piston rod is immersed into the fluid chamber.

15. The damper according to claim 14, wherein the volume compensating device includes:
a seal configured to seal the fluid chamber relative to the piston rod and/or relative to an inner wall of the damper housing, and/or
a support element configured to guide the seal in the damper housing, and/or
a spring element configured to return the seal at least partially in a direction toward an initial position after a performed damping stroke.

16. The damper according to claim 15, wherein the spring element and the seal and/or the spring element and the support element are formed together to a common compensating member so as to have an integral one-piece configuration.

17. The damper according to claim 16, wherein the sealing element, the piston, and the compensating member are arranged along an axial direction on the piston rod.

18. A damper for a fitting for movably supporting a pivoting element or a pull-out element relative to a stationary carrier, the damper comprising:
a damper housing,
a fluid chamber arranged in the damper housing,
a damping fluid arranged in the fluid chamber,
a piston displaceably supported in the fluid chamber,
a streaming channel configured to allow the damping fluid to bypass the piston during a damping stroke,
a piston rod attached to the piston and extending out of the damper housing,
a sealing element having:
  a first section configured to bear against an inner wall of the fluid chamber, and
  a second section spaced apart from the inner wall of the fluid chamber and configured to be moved relative to the first section above a predetermined threshold value of a pressure application to the piston, and a return spring configured to return the piston to an initial position after a damping stroke.

19. The damper according to claim 18, wherein the return spring is supported on an end face of the fluid chamber.

20. A fitting for movably supporting a pivoting element or a pull-out element relative to a stationary carrier, the fitting comprising the damper according to claim 1.

21. The fitting according to claim 20, wherein the fitting is a hinge, a furniture drive, or a drawer pull-out guide for moving a movable furniture part.

22. The damper according to claim 1, wherein the sealing element is ring-shaped, and the second section of the sealing element is ring-shaped and is configured to be pivoted, tilted, and/or radially widened relative to the first section above the predetermined threshold value of the pressure application to the piston.

23. The damper according to claim 1, wherein the overload channel is arranged in the piston.

* * * * *